United States Patent
Kikuzuki

(10) Patent No.: US 8,964,558 B2
(45) Date of Patent: Feb. 24, 2015

(54) TRANSMISSION CONTROL METHOD AND COMMUNICATION APPARATUS

(75) Inventor: Tatsuya Kikuzuki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 273 days.

(21) Appl. No.: 13/613,255

(22) Filed: Sep. 13, 2012

(65) Prior Publication Data
US 2013/0121181 A1 May 16, 2013

(30) Foreign Application Priority Data
Nov. 10, 2011 (JP) ................................ 2011-246832

(51) Int. Cl.
*H04J 1/16* (2006.01)
*H04W 52/02* (2009.01)
*H04L 1/20* (2006.01)
*H04W 84/18* (2009.01)
*H04W 88/08* (2009.01)
*H04W 88/16* (2009.01)

(52) U.S. Cl.
CPC ............ *H04W 52/0222* (2013.01); *H04L 1/20* (2013.01); *H04W 52/0245* (2013.01); *H04W 84/18* (2013.01); *H04W 88/08* (2013.01); *H04W 88/16* (2013.01)
USPC ............................ 370/235; 370/230; 370/232

(58) Field of Classification Search
USPC ................................. 370/229–235
See application file for complete search history.

(56) References Cited

U.S. PATENT DOCUMENTS

| 5,862,476 | A * | 1/1999 | Hasegawa ................... 455/432.2 |
| 7,996,047 | B2 * | 8/2011 | Seier ............................. 455/567 |
| 8,228,876 | B2 * | 7/2012 | Lim ............................... 370/332 |
| 2006/0114859 | A1 | 6/2006 | Sudo et al. |
| 2008/0031144 | A1 * | 2/2008 | Kawamoto et al. ........... 370/242 |
| 2008/0268897 | A1 * | 10/2008 | Seier .......................... 455/550.1 |
| 2010/0062773 | A1 * | 3/2010 | Yokota .......................... 455/437 |

FOREIGN PATENT DOCUMENTS

| JP | 2001-128226 | 5/2001 |
| JP | 2009-134363 | 6/2009 |

* cited by examiner

*Primary Examiner* — Phuc Tran
(74) *Attorney, Agent, or Firm* — Katten Muchin Rosenman LLP

(57) ABSTRACT

A transmission control method performed in a communication apparatus, the transmission control method including: receiving a packet from a counterparty apparatus, measuring a quality of communication with the counterparty apparatus and the fluctuation amount of the quality, controlling a transmission so as to transmit a packet to the counterparty apparatus when the fluctuation amount is relatively large in accordance with a first level and the quality is relatively high in accordance with a second level, and not to transmit a packet to the counterparty apparatus when the fluctuation amount is relatively large in accordance with the first level and the quality is relatively low in accordance with the second level.

10 Claims, 11 Drawing Sheets

TRANSMISSION CONTROL METHOD AND COMMUNICATION APPARATUS

CROSS-REFERENCE TO RELATED APPLICATION

This application is based upon and claims the benefit of priority of the prior Japanese Patent Application No. 2011-246832, filed on Nov. 10, 2011, the entire contents of which are incorporated herein by reference.

FIELD

The embodiments discussed herein are related to a transmission control method and a communication apparatus.

BACKGROUND

With wireless communication, there is a technology of shifting into a sleep operation without conducting transmission at data transmission time for the purposes of effectively using bandwidth and power saving. For example, there is a technology in which when a packet has been received from a base station, a terminal station transmits a packet to the base station, and when the packet is not able to be received from the base station, the terminal station does not transmit the packet to the base station.

There is also a technology in which a threshold is decided after packet transmission fails two or more times and the packet transmission is suspended until a received signal strength indication (RSSI) exceeds the threshold, which was decided when the failure occurred. This technology is effective for a code division multiple access (CDMA) system or the like in which attenuation values of the signal strength indication between an uplink and a downlink may be largely different from each other.

In addition, there is also a system such as a carrier sense multiple access with collision avoidance (CSMA/CA). In this system, a received electric field intensity of packets causing interference is measured, and when it is detected that there is another terminal station inside transmission range, packet transmission is suspended.

See Japanese Laid-open Patent Publication No. 2001-128226 and Japanese Laid-open Patent Publication No. 2009-134363.

SUMMARY

According to an aspect of the invention, a transmission control method performed in a communication apparatus, the transmission control method includes receiving a packet from a counterparty apparatus, measuring a quality of communication with the counterparty apparatus and the fluctuation amount of the quality, controlling a transmission so as to transmit a packet to the counterparty apparatus when the fluctuation amount is relatively large in accordance with a first level and the quality is relatively high in accordance with a second level, and not to transmit a packet to the counterparty apparatus when the fluctuation amount is relatively large in accordance with the first level and the quality is relatively low in accordance with the second level.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

With the related art technology, there may be a problem of high energy consumption, due to the occurrence of wasteful packet transmission, intermittent failures of the packet transmission, and the like.

For example, with technology that controls packet transmission depending on a packet reception situation with respect to the base station, packets from the base station may be received, but in a situation where an error occurs only in packet transmission to the base station, wasteful transmission of packets occurs, and wasteful power is consumed. To be more specific, irrespective of a high packet error rate, wasteful transmission and wasted power may occur in situation such as when packets are able to be occasionally received from the base station or when the transmission power of the base station is higher than the transmission power of the terminal station.

With technology that suspends packet transmission until the RSSI exceeds a threshold, when the coherence time with respect to the fluctuation of the RSSI is not sufficiently longer than the packet retransmission time interval, packet transmission failure intermittently occurs. To be more specific, since monitoring of the RSSI is started after the packet transmission fails two or more times, monitoring of the RSSI is not started in an instable situation where packet transmission repeatedly fails and succeeds, and packet transmission is not suspended. For this reason, wasteful transmission is caused in which packet transmission repeatedly fails and succeeds, and power is wastefully consumed.

In addition, the technology that detects other terminal stations that interferes with packet transmission is merely to avoid interference, and does not predict a phenomenon in which interfering power does not exist but failure occurs because an attenuation amount between the base station and the relevant terminal station is high. Therefore, despite there being no interfering terminal station, a case may occur in which an error in packet transmission repeatedly occurs. In this case, packets are frequently retransmitted, and energy consumption may be relatively high.

The technology disclosed herein has been made in light of the above-mentioned circumstances, and a transmission control method and a communication apparatus which may reduce energy consumption are provided.

Hereinafter, embodiments of the transmission control method and the communication apparatus disclosed in the present application will be described in detail based on the drawings. The embodiments are not intended to limit the technology disclosed herein.

First Embodiment

Overall Configuration

Figure 1:
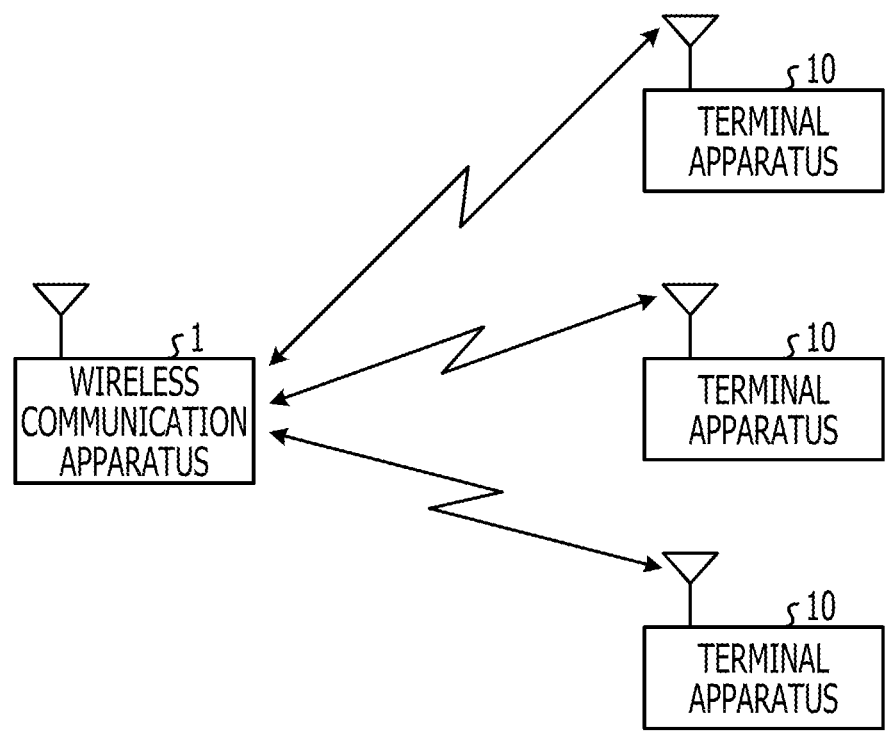
FIG. 1 illustrates an overall configuration example of a wireless communication system according to a first embodiment.

FIG. 1 illustrates an example of an overall configuration of a wireless communication system according to the first embodiment. As illustrated in FIG. 1, in this wireless communication system, a wireless communication apparatus 1 and a plurality of terminal apparatuses 10 are mutually connected via wireless communication. The number of terminals illustrated in FIG. 1 and the like are merely an example and the embodiment is not limited to the number displayed.

The wireless communication apparatus 1 is an apparatus configured to transmit to the respective terminal apparatuses a request packet for requesting data and to receive a response packet. For example, an example of the wireless communication apparatus 1 is a base station, a gateway apparatus in an ad-hoc network, and the like.

When a terminal apparatus 10 receives a request packet from the wireless communication apparatus 1 or the terminal apparatus 10 detects a given trigger event, the terminal apparatus 10 transmits a packet to the wireless communication apparatus 1. For example, the terminal apparatus 10 has an internal or external sensor and transmits a packet, which includes a value obtained by the sensor, to the wireless communication apparatus 1. Various sensors may be used, and a value that can be obtained by the sensor includes acceleration, temperature, humidity, and the like.

The terminal apparatus 10 receives a packet from the wireless communication apparatus 1, determines whether an amount of fluctuation in the quality of communication with the wireless communication apparatus 1 exceeds a first threshold, and determines whether the quality of the communication when the packet is received exceeds a second threshold. When it is determined that the fluctuation amount exceeds the first threshold and the quality of the communication exceeds the second threshold, the terminal apparatus 10 transmits a response packet to the wireless communication apparatus 1. However, when it is determined that the fluctuation amount exceeds the first threshold but the quality of the communication does not exceed the second threshold, the terminal apparatus 10 suspends packet transmission to the wireless communication apparatus 1.

In the above manner, for example, by executing the packet transmission when the fluctuation amount of the RSSI with respect to the wireless communication apparatus 1 is high and the RSSI at the time of packet reception exceeds a threshold, the terminal apparatus 10 suspends packet transmission in a state in which transmission is likely to fail. As a result, since electricity consumed by wasteful packet transmission may be suppressed, electricity consumption may be suppressed.

Functional Block

Figure 2:
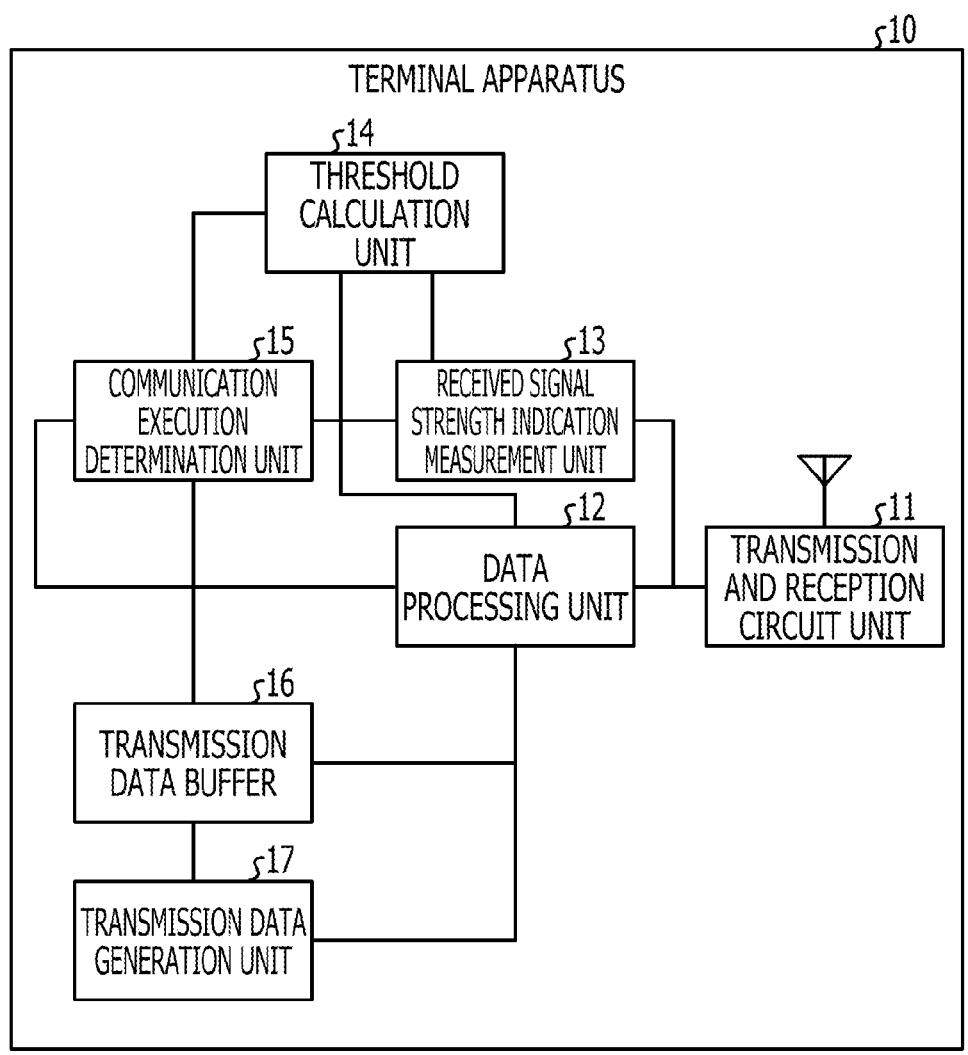
FIG. 2 is a functional block diagram of a configuration of a terminal apparatus according to the first embodiment.

FIG. 2 is a functional block diagram of a configuration of a terminal apparatus according to the first embodiment. As illustrated in FIG. 2, the terminal apparatus 10 includes a transmission and reception circuit 11, a data processing unit 12, an RSSI measurement unit 13, a threshold calculation unit 14, a communication execution determining unit 15, a transmission data buffer 16, and a transmission data generating unit 17.

The transmission and reception circuit 11 is a processing unit configured to transmit and receive data with respect to the wireless communication apparatus 1 or another terminal apparatus. For example, the transmission and reception circuit 11 receives a packet from the wireless communication apparatus 1 or the like and outputs the received packet to the data processing unit 12 or the like. In addition, the transmission and reception circuit 11 transmits data input from the data processing unit 12 to an apparatus given as a destination.

The data processing unit 12 is a processing unit configured to execute various processes on the received packet as well as data to be transmitted. For example, when a packet is received by the transmission and reception circuit 11, the data processing unit 12 determines whether data can be received normally based on a bit error rate of the packet or the like and replies with an acknowledgement (ACK) when it is determined that data can be received. The data processing unit 12 also counts the number of times that transmission succeeded and the number of times that packet has been successfully received, to be held in a storage apparatus such as a memory.

In addition, the data processing unit 12 holds route information such as a routing table and transmits a packet to counterparty apparatus by using the route information. For example, the transmission and reception circuit 11 receives a request for data from the wireless communication apparatus 1. In this case, the data processing unit 12 shifts into a standby state to wait for a determination on data transmission by the communication execution determining unit 15. Then, when an instruction for putting data transmission to sleep is accepted from the communication execution determining unit 15, the data processing unit 12 maintains a standby state without transmitting data.

However, when an instruction for data transmission is accepted from the communication execution determining unit 15, the data processing unit 12 reads a packet from the transmission data buffer 16. Subsequently, the data processing unit 12 transmits the read packet to the destination via the transmission and reception circuit 11. After that, when an ACK is received from the destination after the transmission but before a given period of time elapses, the data processing unit 12 determines that transmission was successful. However, when an ACK is not received from the destination after the transmission but before the given period of time elapses, the data processing unit 12 executes retransmission processing or the like.

The RSSI measurement unit 13 is a processing unit that measures a RSSI when a packet is received by the transmission and reception circuit 11. The RSSI measurement unit 13 outputs the measured RSSI to the threshold calculation unit 14 and the communication execution determining unit 15. Because a common technique can be used to measure RSSI, a detailed description thereof is omitted.

The threshold calculation unit 14 is a processing unit configured to update a threshold by using the RSSI input from the RSSI measurement unit 13. For example, the threshold calculation unit 14 may calculate an average value of either the RSSI measured within a given period of time or the RSSI measured in the past five times as a threshold. In addition, the threshold calculation unit 14 may take into account reception success and reception failure. For example, in the threshold calculation unit 14, the threshold may be 1.5 times the average RSSI when reception fails, and the threshold may be 0.8 times the average RSSI when reception succeeds. In this manner, the threshold calculation unit 14 calculates the threshold through a previously specified technique and outputs to the communication execution determining unit 15.

The communication execution determining unit 15 is a processing unit configured to determine whether a packet is to be transmitted. To be more specific, the communication execution determining unit 15 determines whether the fluctuation amount of the RSSI with respect to a counterparty apparatus exceeds a threshold. The communication execution determining unit 15 also determines whether the RSSI when a packet is received exceeds a threshold. Then, when it is determined that the fluctuation amount exceeds the fluctuation threshold and that the RSSI exceeds the RSSI threshold, the communication execution determining unit 15 transmits the packet to the counterparty apparatus. However, when it is determined that the fluctuation amount exceeds the fluctuation threshold and also the RSSI does not exceed the RSSI threshold, the communication execution determining unit 15 suspends packet transmission to the counterparty apparatus.

For example, the communication execution determining unit 15 calculates an average value of either the RSSI measured within a given period of time or the RSSI measured in the past T seconds. Then, when the RSSI deviates from the average RSSI by 5 dB or more, the communication execution determining unit 15 determines that the fluctuation amount of the RSSI exceeds the threshold. When the RSSI the RSSI does not deviate from the average RSSI by 5 dB or more, the communication execution determining unit 15 determines that the fluctuation amount of the RSSI does not exceed the fluctuation threshold.

When the fluctuation amount of the RSSI exceeds the fluctuation threshold, the communication execution determining unit 15 determines whether the RSSI input from the RSSI measurement unit 13 exceeds the RSSI threshold updated by the threshold calculation unit 14. For example, when the RSSI is 40 dB and the RSSI threshold is 30 dB, the communication execution determining unit 15 instructs the data processing unit 12 to perform packet transmission. However, when the RSSI is 20 dB and the RSSI threshold is 30 dB, the communication execution determining unit 15 outputs an instruction for putting packet transmission with data processing unit 12 to sleep.

When the fluctuation amount of the RSSI does not exceed the fluctuation threshold, the communication execution determining unit 15 determines whether the number of transmission errors counted by the data processing unit 12 exceeds a given threshold. Then, when the number of transmission errors does not exceed the error threshold, the communication execution determining unit 15 instructs the data processing unit 12 to perform packet transmission. However, when the number of transmission errors of the packet exceeds the error threshold, the communication execution determining unit 15 outputs an instruction putting packet transmission with the data processing unit 12 to sleep. In this case, when the RSSI exceeds the RSSI threshold, the communication execution determining unit 15 may instruct the data processing unit 12 to perform packet transmission.

The transmission data buffer 16 is a storage region or a storage apparatus that temporarily stores packets to be transmitted. The transmission data generating unit 17 is a processing unit configured to generate a packet from data to be transmitted that is stored in the transmission data buffer 16. For example, each time a value is obtained from a sensor, which is connected internally or externally to the terminal apparatus 10 and not illustrated in the drawing, the transmission data generating unit 17 generates a packet, which includes the obtained sensor value, to be sequentially stored in the transmission data buffer 16.

Specific Examples

Next, by using FIG. 3, FIG. 4, and FIG. 5, determination of the fluctuation amount, data transmission control when the fluctuation amount is high, and data transmission control when the fluctuation amount is low will be described.

Determination of Fluctuation Amount

Figure 3:
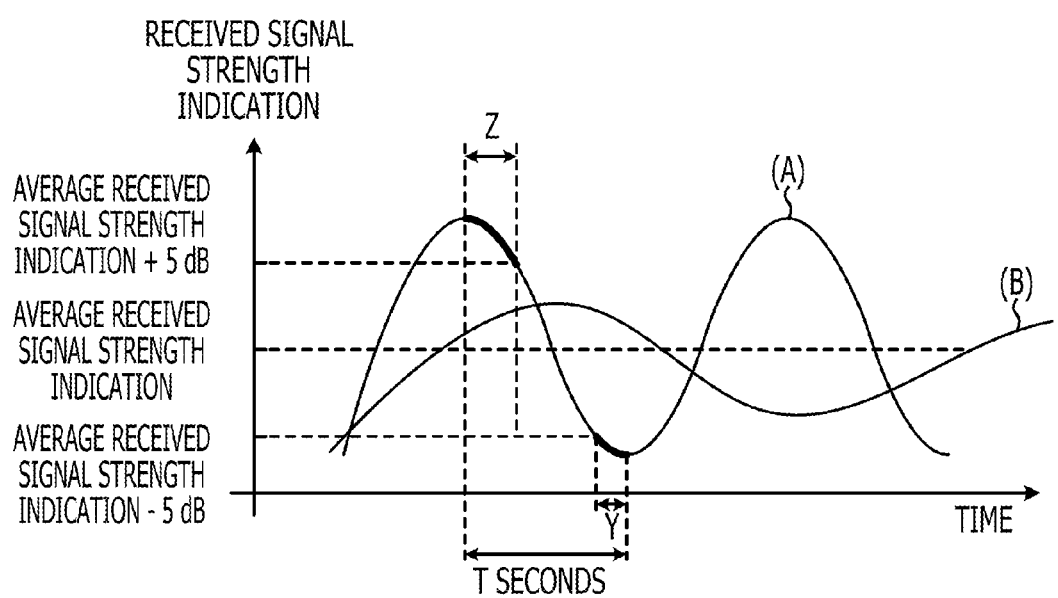
FIG. 3 is a diagram that illustrates a determination of a fluctuation amount.

FIG. 3 is a diagram for describing a determination of a fluctuation amount. The diagram of FIG. 3 illustrates a change in the RSSI when packets are received from the wireless communication apparatus 1 with the horizontal axis representing time, and the vertical axis representing RSSI. To be more specific, the communication execution determining unit 15 can create FIG. 3 by plotting the RSSI input from the RSSI measurement unit 13 and the measurement time. That is, FIG. 3 illustrates fluctuation of the RSSI when packets are received from the wireless communication apparatus 1.

For example, with (A) in FIG. 3, the communication execution determining unit 15 identifies that there is a period Z in which the RSSI is higher than the average RSSI by 5 dB or more and also a period Y in which the RSSI is lower than the average RSSI by 5 dB or more in the arbitrary T seconds. As a result, the communication execution determining unit 15 determines that the fluctuation amount of the RSSI exceeds the fluctuation threshold. That is, the communication execution determining unit 15 determines that the fluctuation amount of the RSSI between the terminal apparatus 10 and the wireless communication apparatus 1 is high.

However, with (B) of FIG. 3, the communication execution determining unit 15 identifies that there is no period in which the RSSI is higher than the average RSSI by 5 dB or more and there is no period in which the RSSI is lower than the average RSSI by 5 dB or more in an arbitrary T seconds. As a result, the communication execution determining unit 15 determines that the fluctuation amount of the RSSI does not exceed the fluctuation threshold. That is, the communication execution determining unit 15 determines that the fluctuation amount of the RSSI between the terminal apparatus 10 and the wireless communication apparatus 1 is low.

In the arbitrary T seconds, for example, after plotting the fluctuation of the RSSI, a time span including both or one of the maximum RSSI and the minimum RSSI can also be set. In addition, in the arbitrary T seconds, a time span from the current time point to T seconds ago can be set. In this manner, for the period of T seconds illustrated in FIG. 3, an arbitrary time span can be set.

Example of Transmission Control

Figure 4:
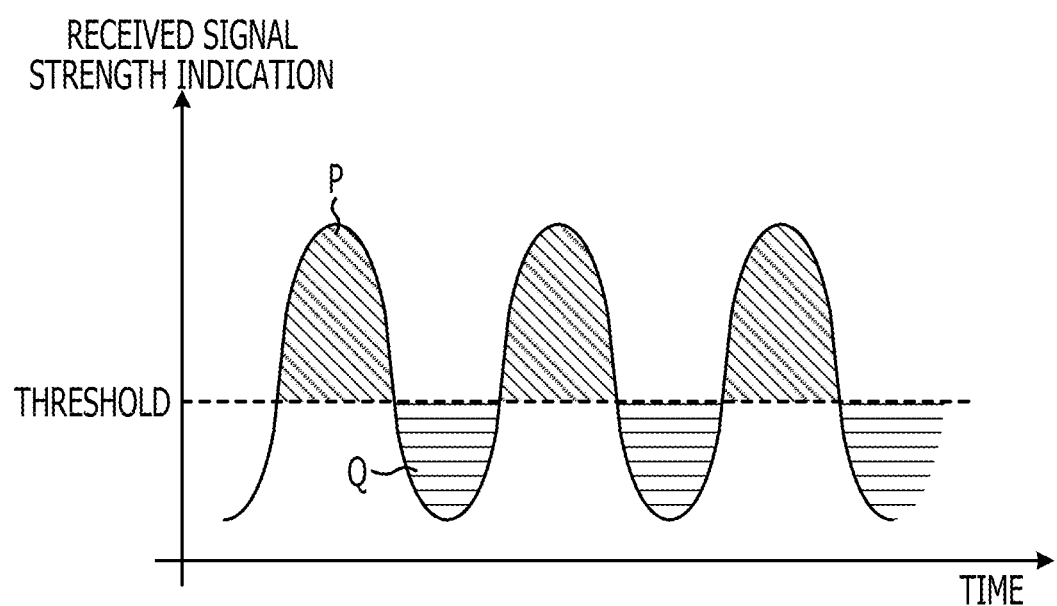
FIG. 4 is a diagram that illustrates transmission control when the fluctuation amount is high.

FIG. 4 is a diagram for describing transmission control when the fluctuation amount is high. FIG. 5 is a diagram for describing the transmission control when the fluctuation amount is low. In FIG. 4 and FIG. 5, the horizontal axis represents time, and the vertical axis represents RSSI. FIG. 4 is a diagram corresponding to (A) of FIG. 3, and FIG. 5 is a diagram corresponding to (B) of FIG. 3.

In the case of FIG. 4, the communication execution determining unit 15 determines that the fluctuation amount of the RSSI exceeds the fluctuation threshold. Therefore, when the time corresponds to a region P in which the RSSI, when packets are received from the wireless communication apparatus 1, exceeds the threshold, the communication execution determining unit 15 decides to transmit a packet to the wireless communication apparatus 1. However, when the time corresponds to a region Q in which the RSSI, when packets are received from the wireless communication apparatus 1, does not exceeds the threshold, the communication execution determining unit 15 decides to put transmission of packets to the wireless communication apparatus 1 to sleep.

Figure 5:
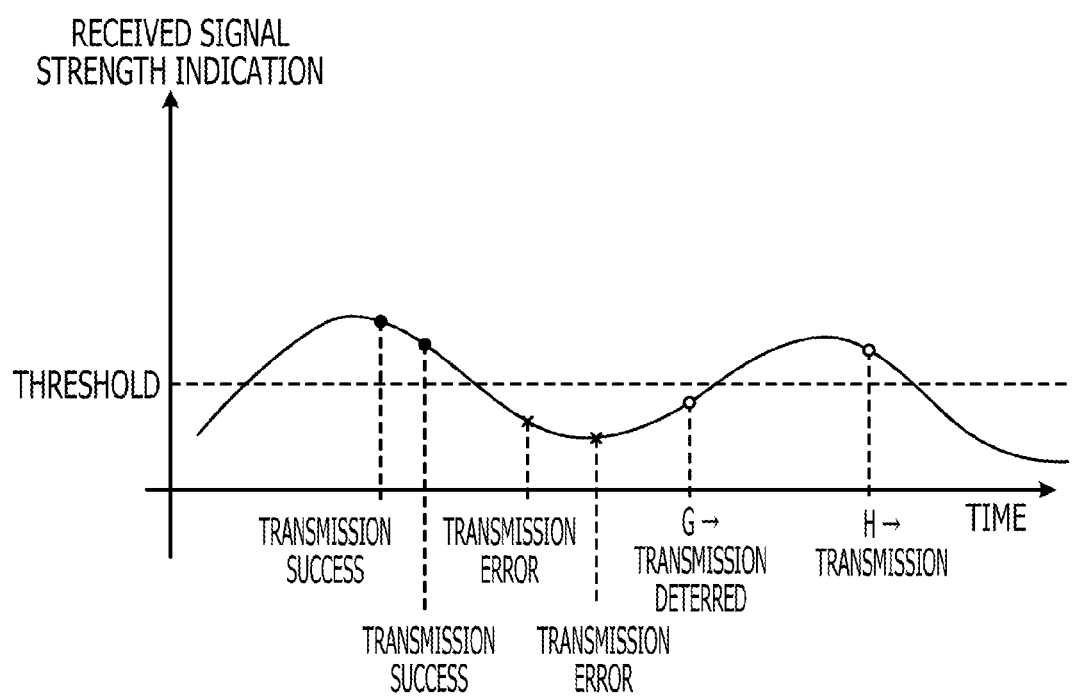
FIG. 5 is a diagram that illustrates transmission control when the fluctuation amount is low.

In the case of FIG. 5, the communication execution determining unit 15 determines that the fluctuation amount of the RSSI does not exceed the fluctuation threshold. Therefore, the communication execution determining unit 15 controls packet transmission by using the number of past transmission errors and the RSSI measured when packets are received from the wireless communication apparatus 1. As an example, the threshold for the number of transmission errors is set as 2. Also, as illustrated in FIG. 5, in the past, it is assumed that the packet transmission has been executed four times in which the transmission succeeded twice and failed twice.

In the above-mentioned example, at a time point G, it is assumed that a packet is received from the wireless communication apparatus 1. In this case, since the number of past packet transmission errors is greater than or equal to the threshold and in addition the RSSI when the packet is received is lower than the threshold, the communication execution determining unit 15 decides to put transmission of packets to the wireless communication apparatus 1 to sleep. However, at a time point H, it is assumed that a packet is received from the wireless communication apparatus 1. In this case, since the number of past packet transmission errors is greater than or equal to the error threshold and in addition the RSSI when the packet was received is greater than or equal to the RSSI threshold, the communication execution determining unit 15 decides to transmit the packet to the wireless communication apparatus 1. In the example in FIG. 5, when the number of past packet transmission errors does not exceed the error threshold, the communication execution determining unit 15 decides to transmit a packet to the wireless communication apparatus 1 irrespective of the RSSI when a packet is received.

Flow of Processing

Figure 6:
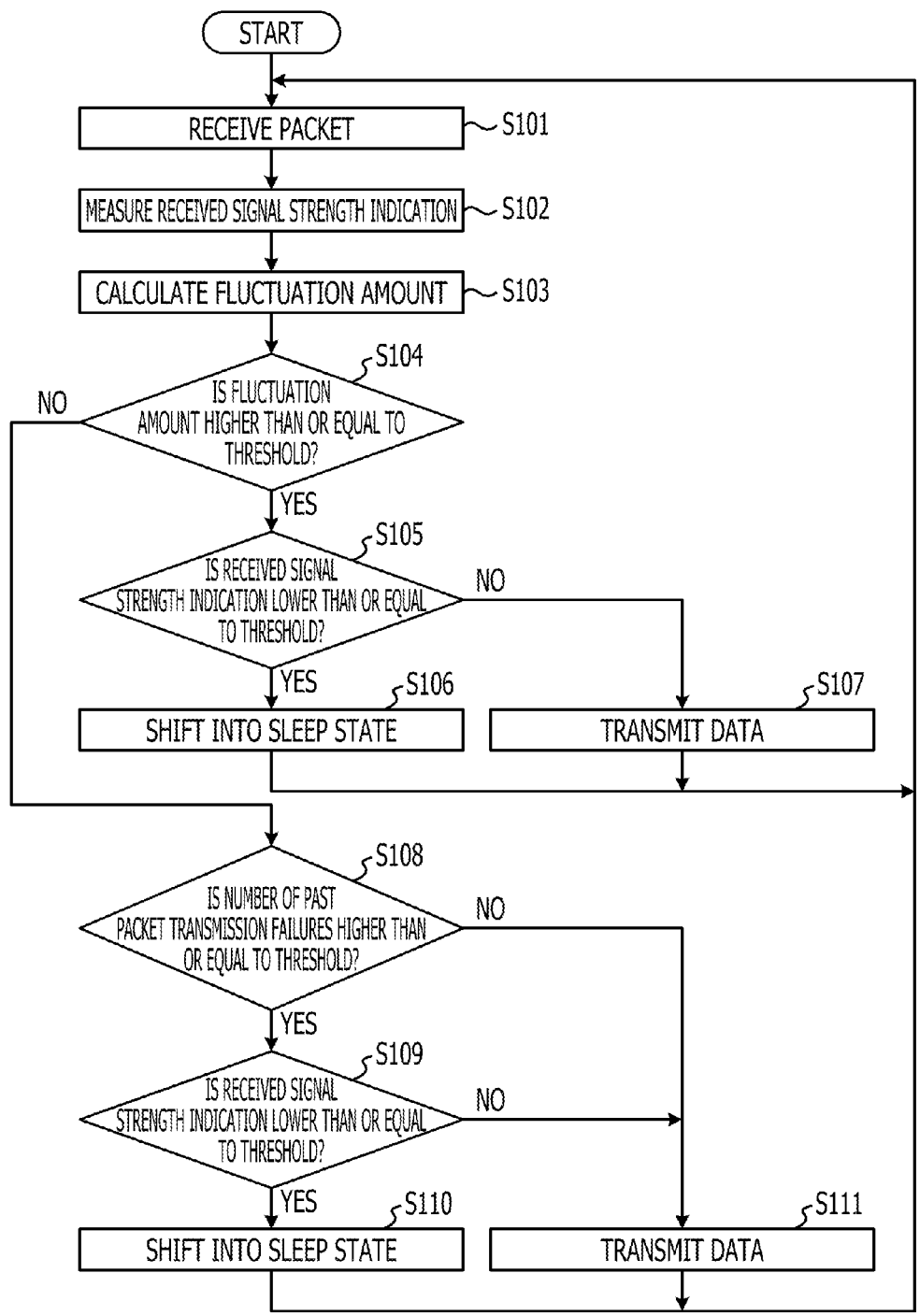
FIG. 6 is a flowchart illustrating a flow of processing executed by a terminal apparatus according to the first embodiment.

Next, a sequence of a flow will be described in which the terminal apparatus 10 according to the first embodiment receives a packet and the fluctuation amount and the RSSI are determined in order to control the packet transmission. FIG. 6 is a flowchart illustrating a flow of processing executed by a terminal apparatus according to the first embodiment.

As illustrated in FIG. 6, the transmission and reception circuit 11 of the terminal apparatus 10 receives a packet that requests the transmission of data from the wireless communication apparatus 1 or the like (S101). At this point, the RSSI measurement unit 13 measures the RSSI when the transmission and reception circuit 11 receives the packet (S102).

Subsequently, the communication execution determining unit 15 calculates the fluctuation amount by plotting the RSSI measured up to the current time point (S103) and determines whether the fluctuation amount is greater than or equal to the fluctuation threshold (S104). That is, the communication execution determining unit 15 determines whether there is a period in which the RSSI is higher than the average RSSI by 5 dB or more in the arbitrary T seconds. In the calculation of the fluctuation amount, it is possible to arbitrarily set whether the RSSI measured in S102 is used.

Then, when it is determined that the fluctuation amount is greater than or equal to the fluctuation threshold (S104: Yes), the communication execution determining unit 15 determines whether the RSSI measured in S102 is less than or equal to the RSSI threshold (S105). At this point, when it is determined that the RSSI is less than or equal to the threshold (S105: Yes), the communication execution determining unit 15 suspends data transmission to the wireless communication apparatus 1 and shifts into a sleep state (S106). However, when the communication execution determining unit 15 determines that the RSSI exceeds the RSSI threshold (S105: No), the data processing unit 12 reads out a packet from the transmission data buffer 16 to be transmitted to the wireless communication apparatus 1 (S107). That is, the data processing unit 12 transmits sensor values obtained by the sensor to the wireless communication apparatus 1.

In S104, when it is determined that the fluctuation amount is lower than the threshold (S104: No), the communication execution determining unit 15 determines whether the number of past packet transmission failures counted by the data processing unit 12 is greater than or equal to the error threshold (S108). At this point, when the communication execution determining unit 15 determines that the number of past packet transmission failures is lower than the threshold (S108: No), the data processing unit 12 reads out a packet from the transmission data buffer 16 to be transmitted to the wireless communication apparatus 1 (S111).

When it is determined that the number of packet transmission failures is greater than or equal to the error threshold (S108: Yes), the communication execution determining unit 15 determines whether the RSSI measured in S102 is less than or equal to the RSSI threshold (S109). At this point, when it is determined that the RSSI is less than or equal to the RSSI threshold (S109: Yes), the communication execution determining unit 15 suspends data transmission to the wireless communication apparatus 1 and shifts into a sleep state (S110). However, when the communication execution determining unit 15 determines that the RSSI exceeds the RSSI threshold (S109: No), the data processing unit 12 reads out a packet from the transmission data buffer 16 to be transmitted to the wireless communication apparatus 1 (S111).

Effects

In the above manner, by transmitting packets when the fluctuation amount of the RSSI with the wireless communication apparatus 1 is high and the RSSI at the time of packet reception exceeds the RSSI threshold, the terminal apparatus 10 suspends packet transmission in a state in which transmission is likely to fail. That is, since the terminal apparatus autonomously determines to only transmit when the attenuation amount in the communication path is low, it may be possible to suppress energy consumption.

Figure 7:
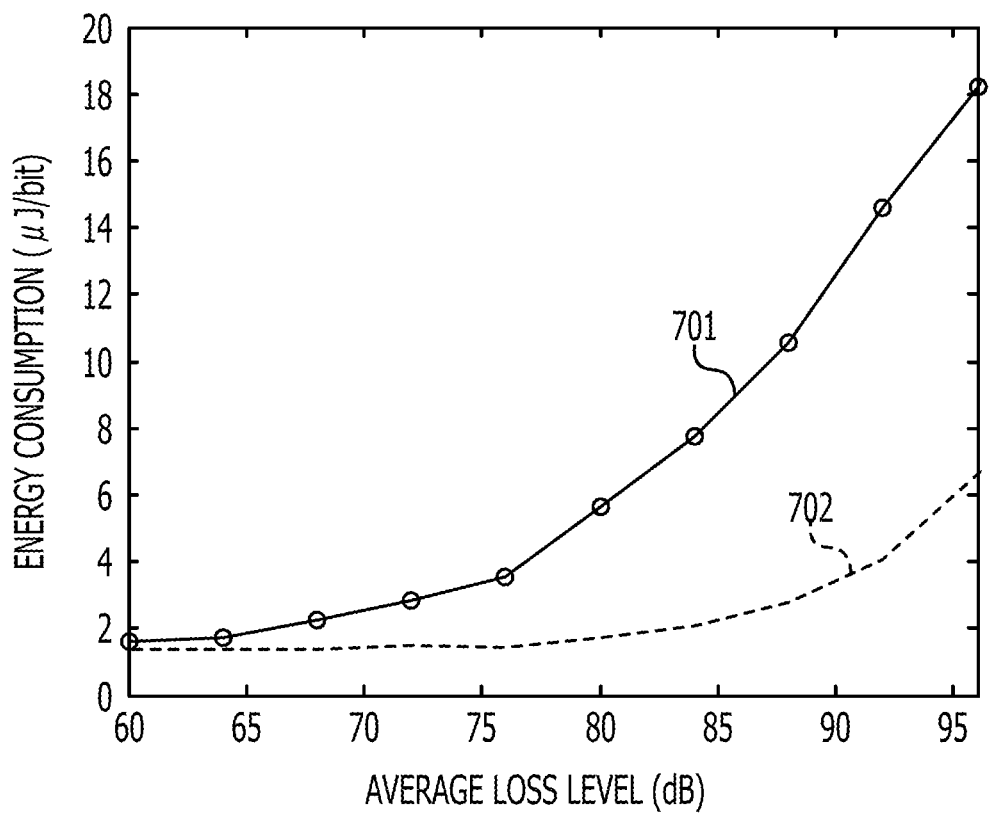
FIG. 7 illustrates a simulation result of energy consumption when the fluctuation amount is low.
Figure 8:
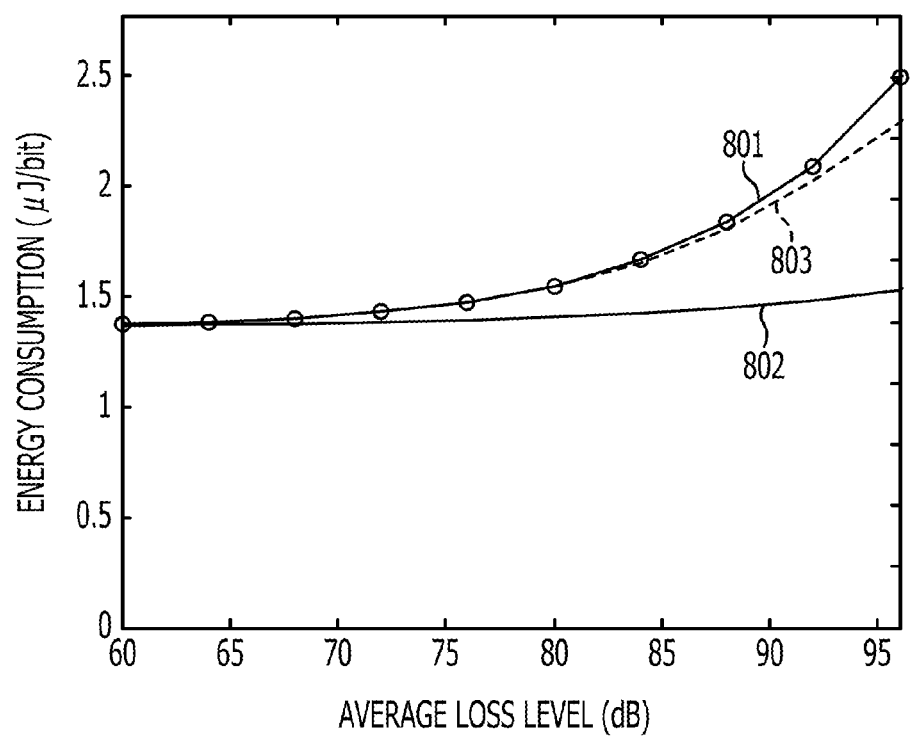
FIG. 8 illustrates a simulation result of energy consumption when the fluctuation amount is high.

Next, by using FIG. 7 and FIG. 8, simulation results for energy consumption will be described. FIG. 7 illustrates a simulation result of energy consumption when the fluctuation amount is low. In FIG. 7 and FIG. 8, an average loss level that indicates the status of the communication path is set on the horizontal axis, and energy consumption, in other words the power consumption, is set on the vertical axis.

FIG. 7 represents energy consumption when a fluctuation amount of the RSSI in the communication path, that is, an attenuation amount fluctuation interval, is 100 seconds with respect to a data transmission interval of 0.1 second. In addition, 701 in FIG. 7 represents change in energy consumption when a related art technique is applied in response to successful packet reception from the wireless communication apparatus 1, and 702 represents change in energy consumption when the technique described according to the present embodiment is applied.

As may be understood from FIG. 7, with regard to 701 according to the related art technique, it is found out that energy consumption increases rapidly as the status of the communication path deteriorates. For this, an increase in the number of retransmissions as the number of transmission errors increase is considered as one of the causes. However, with 702 to which the present embodiment is applied, it is found out that the rate of increase of energy consumption is low even when the status of the communication path deteriorates and is prominently lower than 701, which represents the related art. In this manner, by comparing the present application with related art techniques, according to the present embodiment, it may be found that it is possible to largely suppress energy consumption when the fluctuation amount is low.

FIG. 8 illustrates a simulation result of energy consumption when the fluctuation amount is high. FIG. 8 represents energy consumption when the fluctuation amount of the RSSI in the communication path, that is, the attenuation amount fluctuation interval is 0.3 seconds with respect to a data transmission interval of 0.1 second. 801 in FIG. 8 represents change in energy consumption when a related art technique is applied in response to successfully receiving packets from the wireless communication apparatus 1. 802 represents change in energy consumption when the technique described according to the present embodiment is applied. 803 represents change in energy consumption when a related art technique of starting monitoring of RSSI after packet transmission fails two or more times is applied.

As may be understood from FIG. 8, with regard to 801 or 803 according to the related art techniques, it may be found that energy consumption increases as the status of the communication path deteriorates. For this, similarly to FIG. 7, an increase in the number of retransmissions as the number of transmission errors increase may be considered as one of the causes. However, with regard to 802 to which the present embodiment has been applied, it may be found out that an increase in energy consumption is low even when the status of the communication path deteriorates and is prominently lower than 801 or 803, which represent the related art. In this manner, by comparing the present embodiment with related art techniques, according to the present embodiment, it may found that it is possible to largely suppress energy consumption when the fluctuation amount is high.

In addition, when FIG. 7 is compared with FIG. 8, it may be found that energy consumption when the present application is applied when the fluctuation amount of FIG. 8 is high is a mostly constant value irrespective of the status of the communication path. As a result, the present application may be effective when the coherent time of the attenuation amount fluctuation in the communication path is short with respect to the data transmission interval.

Second Embodiment

Next, other than the technique described according to the first embodiment, transmission processing in which a threshold update period is taken into account and transmission processing in which a remaining space of a buffer is taken into account may be used. According to a second embodiment, transmission processing in which the threshold update period is taken into account and transmission processing in which the remaining space of the buffer is taken into account will be described.

Combination

The above-mentioned embodiments can be arbitrarily combined. In addition, according to the first embodiment, an example has been described where when the fluctuation amount is low, the number of transmission failures is determined, and thereafter the RSSI is determined, but when the fluctuation amount is low, it may be possible to put packet transmission into a sleep state. In addition, when the fluctuation amount is low, only one of either the number of transmission failures or the RSSI may be determined.

Threshold Update Period

Figure 9:
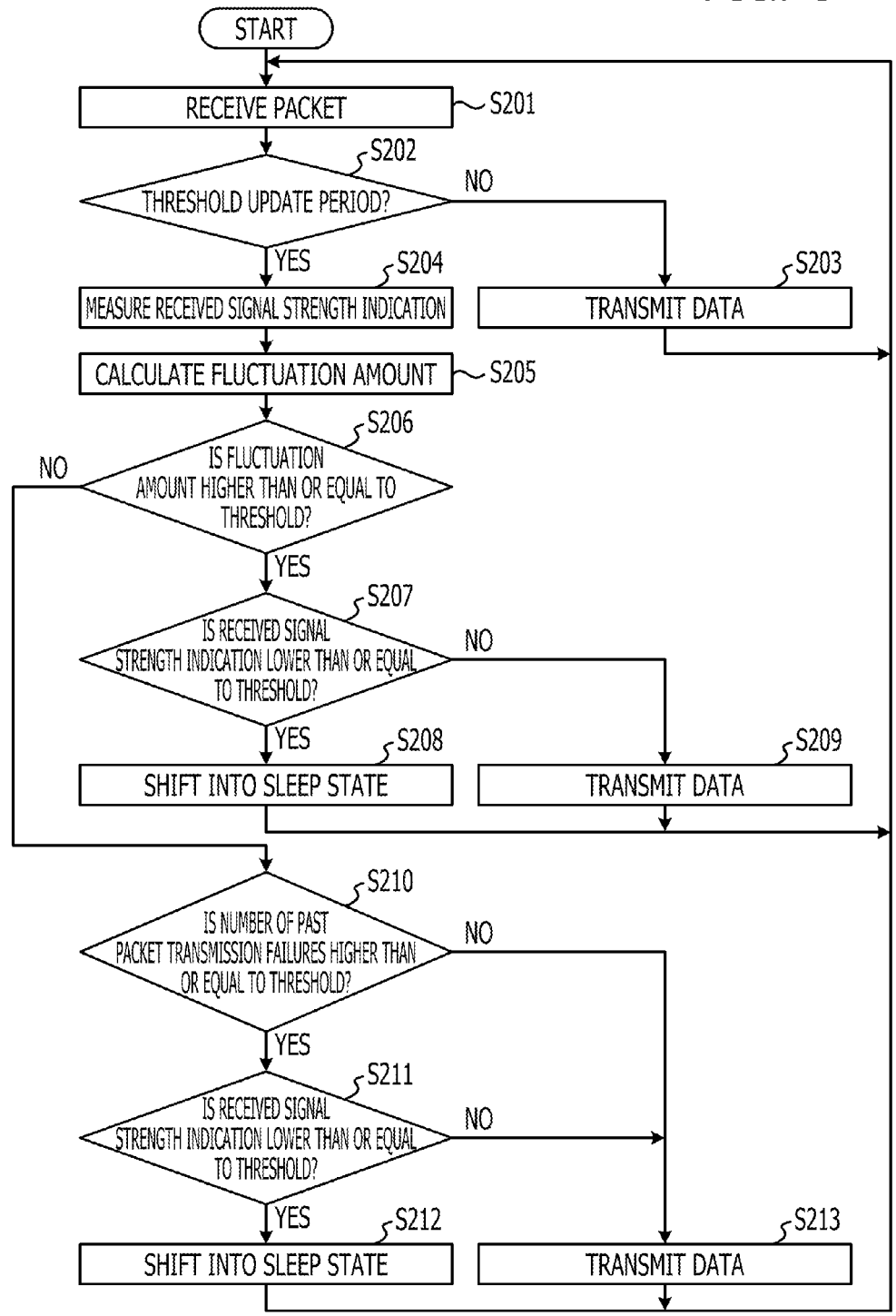
FIG. 9 is a flowchart illustrating a flow of processing when a threshold update period is provided.

FIG. 9 is a flowchart illustrating a flow of processing when a threshold update period is provided. As illustrated in FIG. 9, the transmission and reception circuit 11 of the terminal apparatus 10 receives a packet, which requests the transmission of data, from the wireless communication apparatus 1 or the like (S201).

At this point, the communication execution determining unit 15 refers to the threshold calculation unit 14 and determines whether the current time is during a threshold update period (S202). The threshold update period indicates a period in which the threshold calculation unit 14 collects data on the RSSI to update the threshold for the RSSI. After the RSSI is collected a given number of times, the threshold calculation unit 14 calculates a new threshold to update the existing threshold.

When the communication execution determining unit 15 determines that the present time is not during a threshold update period (S202: No), the data processing unit 12 reads out a packet from the transmission data buffer 16 to be transmitted to the wireless communication apparatus 1 without measuring the RSSI or determining the fluctuation amount (S203).

When the communication execution determining unit 15 determines that the present time is during a threshold update period (S202: Yes), the terminal apparatus 10 executes processing from S204 to S213. The processing from S204 to S213 is similar to the processing from S102 to S111 described in FIG. 6, and a detail description thereof is omitted.

In the above manner, when a packet that requests data is received from the wireless communication apparatus 1 during the threshold update period, the terminal apparatus 10 may be able to prioritize data transmission. As a result, as compared with the technique described according to the first embodiment, since a sensor value or the like may be promptly replied, it may be possible to suppress packet delay.

Remaining Space of the Buffer

Figure 10:
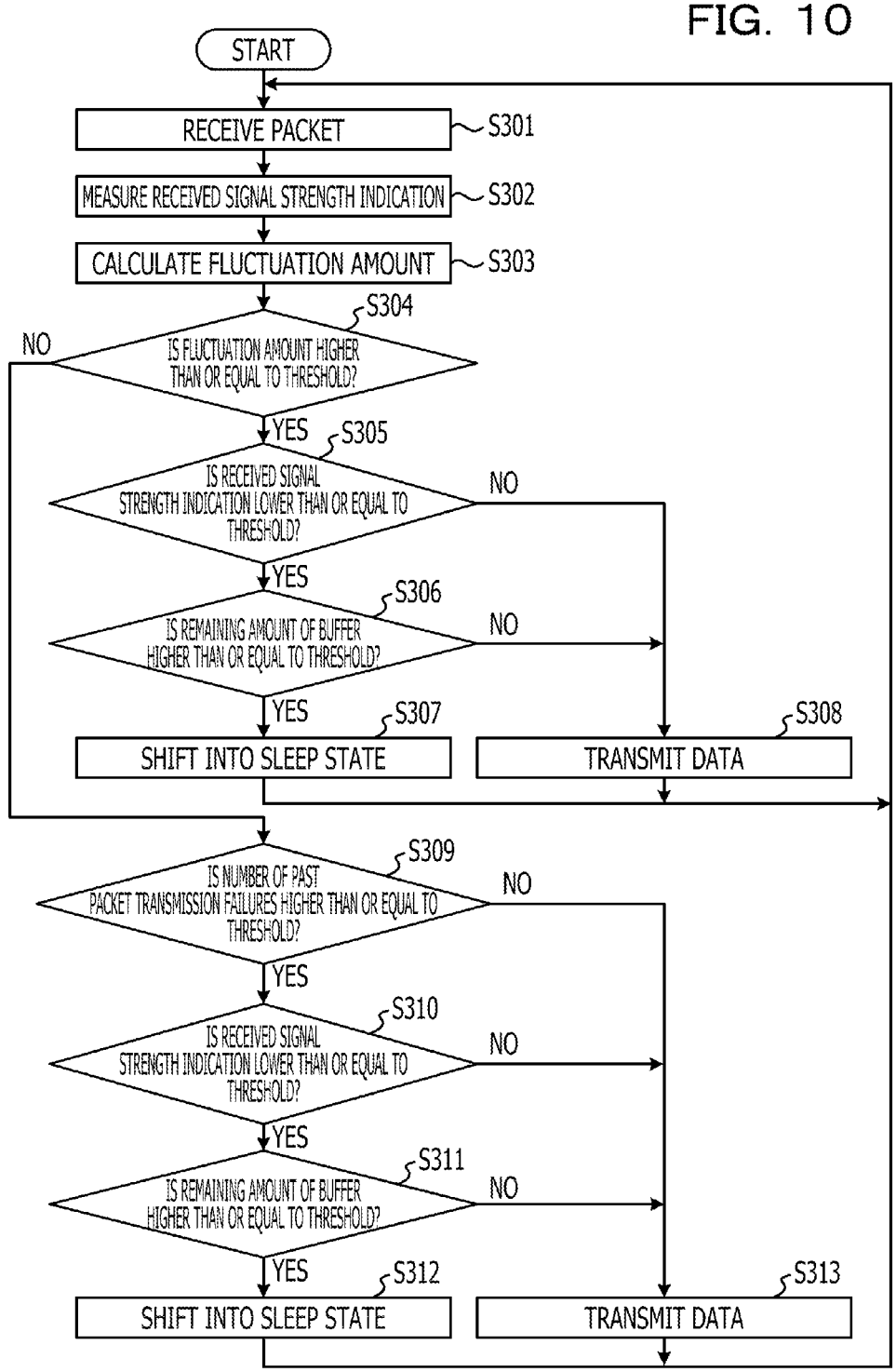
FIG. 10 is a flowchart illustrating a flow of a processing when the remaining space of a transmission data buffer is taken into account.

FIG. 10 is a flowchart illustrating a flow of processing when the remaining space of the transmission data buffer is taken into account. As illustrated in FIG. 10, the processing from S301 to S305 is similar to the processing from S101 to S105.

Speaking simply, the transmission and reception circuit 11 of the terminal apparatus 10 receives a packet, which requests transmission of data, from the wireless communication apparatus 1 or the like (S301). At this point, the RSSI measurement unit 13 measures the RSSI when the packet is received by the transmission and reception circuit 11 (S302). Subsequently, the communication execution determining unit 15 calculates the fluctuation amount by plotting the RSSI measured up to the current time (S303) and determines whether the fluctuation amount is greater than or equal to the fluctuation threshold (S304). Then, when it is determined that the fluctuation amount is greater than or equal to the fluctuation threshold (S304: Yes), the communication execution determining unit 15 determines whether the RSSI measured in S302 is less than or equal to the RSSI threshold (S305).

Subsequently, when it is determined that the RSSI is less than or equal to the RSSI threshold (S305: Yes), the communication execution determining unit 15 refers to the transmission data buffer 16 and determines whether the remaining space of the buffer is greater than or equal to a buffer threshold (S306). For example, one packet is set as 1 MB, the capacity of the transmission data buffer 16 is set as 10 MB, and the buffer threshold is 5 MB or higher. In this example, when six or more packets are stored in the transmission data buffer 16, the communication execution determining unit 15 determines that the remaining space is 4 MB or less and is lower than the threshold. On the other hand, when five or fewer packets are stored in the transmission data buffer 16, the communication execution determining unit 15 determines that the remaining space is 5 MB or more and is greater than or equal to the buffer threshold.

When the remaining space of the buffer is greater than or equal to the buffer threshold (S306: Yes), the communication execution determining unit 15 suspends data transmission to the wireless communication apparatus 1 and shifts into a sleep state (S307). However, when the communication execution determining unit 15 determines that the remaining space of the buffer is lower than the threshold (S306: No), the data processing unit 12 reads out a packet from the transmission data buffer 16 and transmits the packet to the wireless communication apparatus 1 (S308).

In S304, when it is determined that the fluctuation amount is lower than the fluctuation threshold (S304: No), the communication execution determining unit 15 determines whether the number of past packet transmission failures counted by the data processing unit 12 is greater than or equal to the error threshold (S309). At this point, when the communication execution determining unit 15 determines that the number of past packet transmission failures is lower than the error threshold (S309: No), the data processing unit 12 reads out a packet from the transmission data buffer 16 and transmits the packet to the wireless communication apparatus 1 (S313).

However, when it is determined that the number of packet transmission failures is greater than or equal to the error threshold (S309: Yes), the communication execution determining unit 15 determines whether the RSSI measured in S302 is less than or equal to the RSSI threshold (S310). At this point, when it is determined that the RSSI is less than or equal to the RSSI threshold (S310: Yes), the communication execution determining unit 15 executes the processing for S311 to S313. The processing for S311 to S313 is similar to the processing from S306 to S308, and a detail description thereof is omitted.

However, when the communication execution determining unit 15 determines that the RSSI exceeds the RSSI threshold (S310: No), the data processing unit 12 reads out a packet from the transmission data buffer 16 and transmits the packet to the wireless communication apparatus 1 (S313).

In the above manner, when no space is available in the buffer area for storing the sensor values, the terminal apparatus 10 can prioritize packet transmission. For this reason, it may be possible to avoid data loss of sensor values and the like.

Third Embodiment

The embodiments of the present application have been described above, but various different modes may be implemented in addition to the above-mentioned embodiments. In view of the above, different embodiments (or alternations) are described below.

Packet Types

According to an above-mentioned embodiment, an example has been described in which the data is transmitted as a response to the reception of a packet from the wireless communication apparatus 1, but for a packet received from the wireless communication apparatus 1, various types of packets can be used. For example, when a poll packet, a beacon packet, or a clock synchronization packet is received, the terminal apparatus 10 can execute processing similar to the above embodiment. That is, when a packet for requesting data transmission is received, the terminal apparatus 10 executes the processing similar to the above-mentioned embodiment.

Data Format

In addition, according to an above-mentioned embodiment, description has been given of where packet is used as the transmission unit but this does not limit the transmission. For example, a frame may be used as the transmission unit of data Determination of Fluctuation Amount According to an above-mentioned embodiment, an example was described in which the RSSI is used to determine the fluctuation amount, but the embodiment is not limited to this. For example, the fluctuation amount may also be determined based on the value of an acceleration sensor, a heart beat sensor, or the like. As an example, if an average value of the values of an acceleration sensor or heart beat sensor received in the past T seconds is greater than or equal to a given value, the fluctuation amount is determined to be high. Alternatively, each time the value of an acceleration sensor or heart beat sensor is received, when the value has increased or decreased, the fluctuation amount is determined to be high.

In addition, for the determination on the fluctuation amount, a bit error rate (BER) may be used. For example, if an average value of BER received in the past T seconds is greater than or equal to a given value, the fluctuation amount is determined to be high. Alternatively, each time a BER value is received, when the value has increased or decreased, the fluctuation amount is determined to be high.

System

In addition, among the respective processing described according to the present disclosure, all or a part of processing described as carried out automatically may also be carried out manually. Alternatively, all or a part of processing described as carried out manually can also be carried out automatically through a related art method. In addition, the processing procedure, the control procedure, the specific names, and the information that includes the various pieces of data and the parameters illustrated in the above description or drawings can arbitrarily be changed if not otherwise specified.

Also, the respective elements of the illustrated respective apparatuses are functionally conceptual and may adopt a configuration physically modified from the illustrated configuration. That is, the specific modes of the separation and integration of the respective apparatuses are not limited to the illustrated modes. That is, all or a part of the respective apparatuses may functionally or physically be separated or integrated in an arbitrary unit to be configured in accordance with various loads and usage situations. For example, the data processing unit 12 can be integrated with the communication execution determining unit 15. Furthermore, all or an arbitrary part of the respective processing functions carried out in the respective apparatuses may be realized by a CPU and a program analyzed and executed by the CPU or realized by hardware based on wired logic.

Hardware Configuration

Figure 11:
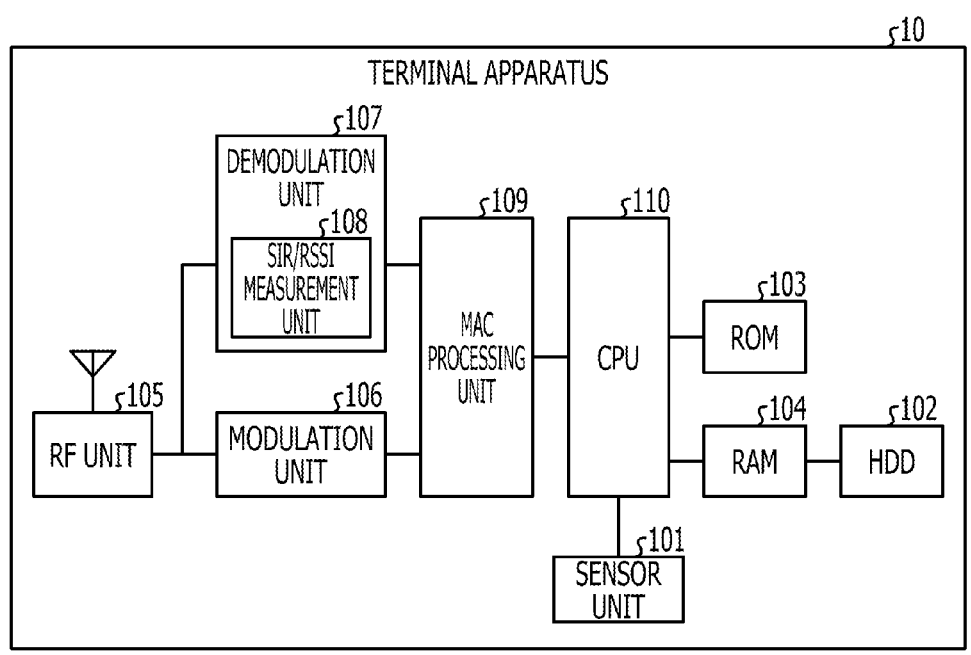
FIG. 11 illustrates an example of a hardware configuration of the terminal apparatus.

Next, a hardware configuration of the terminal apparatus 10 according to the above-mentioned embodiment will be described. FIG. 11 illustrates a hardware configuration example of the terminal apparatus. As illustrated in FIG. 11, the terminal apparatus 10 includes a sensor unit 101, a hard disk drive (HDD) 102, a read only memory (ROM) 103, and a random access memory (RAM) 104. In addition, the terminal apparatus 10 includes an RF unit 105, a modulation unit 106, a demodulation unit 107, an MAC (Media Access Control) processing unit 109, and a central processing unit (CPU) 110.

The sensor unit 101 may include various sensors such as an acceleration sensor, a temperature sensor, or a humidity sensor and stores sensed values in the HDD 102 or the RAM 104. The HDD 102 is a storage apparatus configured to store various pieces of data, thresholds, and sensor values and corresponds to the transmission data buffer 16 illustrated in FIG. 2. The ROM 103 is a storage apparatus configured to store various algorithms such as a determining and controlling link quality fluctuation, determining and controlling packet failure, comparing thresholds, and shifting to sleep. For example, the ROM 103 stores programs that execute the respective functions described according to the above-mentioned embodiment. The RAM 104 is a storage apparatus configured to store various pieces of data, thresholds, and sensor values similarly to the HDD 102.

The RF unit 105 is a circuit configured to control wireless communication and corresponds to the transmission and reception circuit 11 illustrated in FIG. 2. The modulation unit 106 is a modulation circuit configured to modulate the data to be transmitted. The demodulation unit 107 is a demodulation circuit configured to demodulate received data. A signal-to-interference ratio (SIR)/RSSI measurement unit 108 provided as part of the demodulation unit 107 is a circuit configured to measure RSSI and corresponds to the RSSI measurement unit 13 illustrated in FIG. 2. The MAC processing unit 109 is a circuit configured to execute processing to determine whether data can be received or the like. The modulation unit 106, the demodulation unit 107, and the MAC processing unit 109 correspond to the data processing unit 12 illustrated in FIG. 2.

The CPU 110 is a processor configured to govern the overall process of the terminal apparatus 10. The CPU 110 realizes functions similar to the respective functions described in FIG. 2 and the above-mentioned embodiments by deploying the programs held in the ROM 103 in the RAM 104 and executing the various processes. That is, the CPU 110 executes functions similar to the threshold calculation unit 14, the communication execution determining unit 15, and the transmission data generating unit 17 illustrated in FIG. 2, and executes packet transmission and sleep control described according to the first embodiment and the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A transmission control method performed in a communication apparatus, the transmission control method comprising:
receiving a packet from a counterparty apparatus;
measuring a quality of communication with the counterparty apparatus and a fluctuation amount of the quality;
controlling a transmission so as to transmit a packet to the counterparty apparatus when the fluctuation amount is relatively large in accordance with a first level and the quality is relatively high in accordance with a second level, not to transmit a packet to the counterparty apparatus when the fluctuation amount is relatively large in accordance with the first level and the quality is relatively low in accordance with the second level, and to transmit a packet to the counterparty apparatus when the fluctuation amount is relatively small in accordance with the first level and a number of past packet transmission failures is relatively small in accordance with a third level.

2. The transmission control method according to the claim 1,
wherein the controlling controls the transmission so as to transmit a packet to the counterparty apparatus when the fluctuation amount is relatively small in accordance with the first level, the number of past packet transmission failures is relatively large in accordance with the third level, and the quality is relatively high in accordance with the second level, and not to transmit a packet to the counterparty apparatus when the fluctuation amount is relatively small in accordance with the first level, the number of past packet transmission failures is relatively large in accordance with the third level, and the quality is relatively low in accordance with the second level.

3. The transmission control method according to the claim 1,
wherein the quality is a received signal strength.

4. The transmission control method according to the claim 1, further comprising:
updating the first level or the second level based on the fluctuation amount or the quality of the communication, in a updating period;
wherein the controlling controls the transmission so as to transmit a packet to the counterparty apparatus in the updating period, regardless of the fluctuation amount.

5. A transmission control method performed in a communication apparatus, the transmission control method comprising:
    receiving a packet from a counterparty apparatus;
    measuring a quality of communication with the counterparty apparatus and a fluctuation amount of the quality;
    controlling a transmission so as to transmit a packet to the counterparty apparatus when the fluctuation amount is relatively large in accordance with a first level and the quality is relatively high in accordance with a second level, and not to transmit a packet to the counterparty apparatus when the fluctuation amount is relatively large in accordance with the first level and the quality is relatively low in accordance with the second level;
    storing a transmitting data to buffer, and
    wherein the controlling controls the transmission so as to transmit a packet to the counterparty apparatus when the fluctuation amount is relatively large in accordance with the first level and a remaining space of the buffer is relatively small, regardless of the quality.

6. A communication apparatus comprising:
    a receiver to receive a packet from a counterparty apparatus;
    a processor to measure a quality of communication with the counterparty apparatus and a fluctuation amount of the quality; and
    a transmitter to transmit a packet to the counterparty apparatus when the fluctuation amount is relatively large in accordance with a first level and the quality is relatively high in accordance with a second level, not to transmit a packet to the counterparty apparatus when the fluctuation amount is relatively large in accordance with the first level and the quality is relatively low in accordance with the second level, and to transmit a packet to the counterparty apparatus when the fluctuation amount is relatively small in accordance with the first level and a number of past packet transmission failures is relatively small in accordance with a third level.

7. The communication apparatus according to the claim 6, wherein the transmitter transmits a packet to the counterparty apparatus when the fluctuation amount is relatively small in accordance with the first level, the number of past packet transmission failures is relatively large in accordance with the third level, and the quality is relatively high in accordance with the second level, and doesn't transmit a packet to the counterparty apparatus when the fluctuation amount is relatively small in accordance with the first level, the number of past packet transmission failures is relatively large in accordance with the third level, and the quality is relatively low in accordance with the second level.

8. The communication apparatus according to the claim 6, wherein the quality is a received signal strength.

9. The communication apparatus according to the claim 6,
    wherein the processor further updates the first level or the second level based on the fluctuation amount or the quality of the communication, in a updating period, and
    the transmitter transmits a packet to the counterparty apparatus in the updating period, regardless of the fluctuation amount.

10. A communication apparatus comprising:
    a receiver to receive a packet from a counterparty apparatus;
    a processor to measure a quality of communication with the counterparty apparatus and a fluctuation amount of the quality; and
    a transmitter to transmit a packet to the counterparty apparatus when the fluctuation amount is relatively large in accordance with a first level and the quality is relatively high in accordance with a second level, and not to transmit a packet to the counterparty apparatus when the fluctuation amount is relatively large in accordance with the first level and the quality is relatively low in accordance with the second level,
    wherein the processor further stores a transmitting data to buffer, and
    the transmitter transmits a packet to the counterparty apparatus when the fluctuation amount is relatively large in accordance with the first level and a remaining space of the buffer is relatively small, regardless of the quality.

* * * * *